United States Patent
Starik et al.

(10) Patent No.: US 11,448,308 B2
(45) Date of Patent: Sep. 20, 2022

(54) WHEEL-HUB GEARS AND CASINGS THEREFOR

(71) Applicant: REE AUTOMOTIVE LTD., Herzliya (IL)

(72) Inventors: Eran Starik, Tel Aviv (IL); Eylon Avigur, Ramat-Gan (IL)

(73) Assignee: REE Automotive Ltd., Kibbutz Glil-Yam (IL)

( * ) Notice: Subject to any disclaimer, the term of this patent is extended or adjusted under 35 U.S.C. 154(b) by 0 days.

(21) Appl. No.: 17/535,727

(22) Filed: Nov. 26, 2021

(65) Prior Publication Data

US 2022/0145983 A1  May 12, 2022

Related U.S. Application Data

(63) Continuation of application No. PCT/IB2021/060232, filed on Nov. 4, 2021.

(60) Provisional application No. 63/111,155, filed on Nov. 9, 2020.

(51) Int. Cl.
*B60G 3/20* (2006.01)
*F16H 57/04* (2010.01)
*F16H 57/029* (2012.01)
*B60K 17/04* (2006.01)
(Continued)

(52) U.S. Cl.
CPC ....... *F16H 57/0424* (2013.01); *B60K 17/046* (2013.01); *F16H 57/029* (2013.01); *B60B 27/0015* (2013.01); *B60B 27/0052* (2013.01); *B60G 3/20* (2013.01); *B60G 2200/144* (2013.01); *B62D 7/20* (2013.01); *F16H 57/045* (2013.01)

(58) Field of Classification Search
CPC . F16H 57/0424; F16H 57/029; B60K 17/046; B60B 27/0015
See application file for complete search history.

(56) References Cited

U.S. PATENT DOCUMENTS

| | | | |
|---|---|---|---|
| 4,496,017 A | 1/1985 | Rogier | |
| 2008/0083572 A1* | 4/2008 | Ishida | B60K 7/0007 180/55 |
| 2012/0222906 A1* | 9/2012 | Yamamoto | B66F 9/07509 475/149 |

OTHER PUBLICATIONS

Form PCT/ISA/206 for PCT/IB2021/060232—mailed from ISA/Israel Patent Office on Mar. 15, 2022.

* cited by examiner

*Primary Examiner* — James A English
*Assistant Examiner* — James J Triggs
(74) *Attorney, Agent, or Firm* — Momentum IP; Marc Van Dyke

(57) ABSTRACT

A gear casing for a wheel-hub assembly comprises a gear housing comprising a drive-gear volume for accommodating therewithin a gearing assembly that is positioned to mediate between a drivetrain member and a wheel-hub member, the drive-gear volume being in fluid communication with opposing first and second openings formed in the gear housing for respective gearing-assembly connections therethrough with the drivetrain member and the wheel hub member; and a lubricant compartment radially displaced from the drive-gear volume and in fluid communication therewith exclusively via an array of one or more lubricant passages disposed circumferentially around a portion of the gear housing, the lubricant-passage array arranged for flow therethrough of a gearing-assembly lubricant between the lubricant compartment and the gear housing.

23 Claims, 6 Drawing Sheets

(51) Int. Cl.
*B62D 7/20* (2006.01)
*B60B 27/00* (2006.01)

FRONT VIEW

INWARD-FACING PERSPECTIVE

FRONT VIEW

INWARD-FACING PERSPECTIVE

INWARD-FACING VIEW

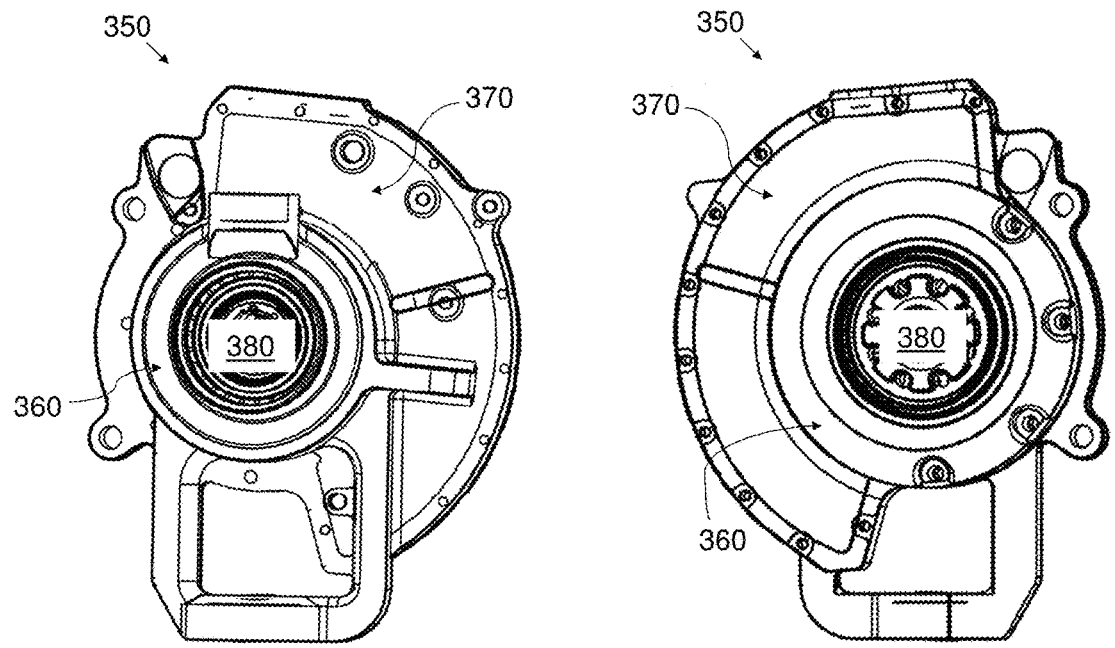
INWARD-FACING VIEW
FIG. 5A
OUTWARD-FACING VIEW
FIG. 5B
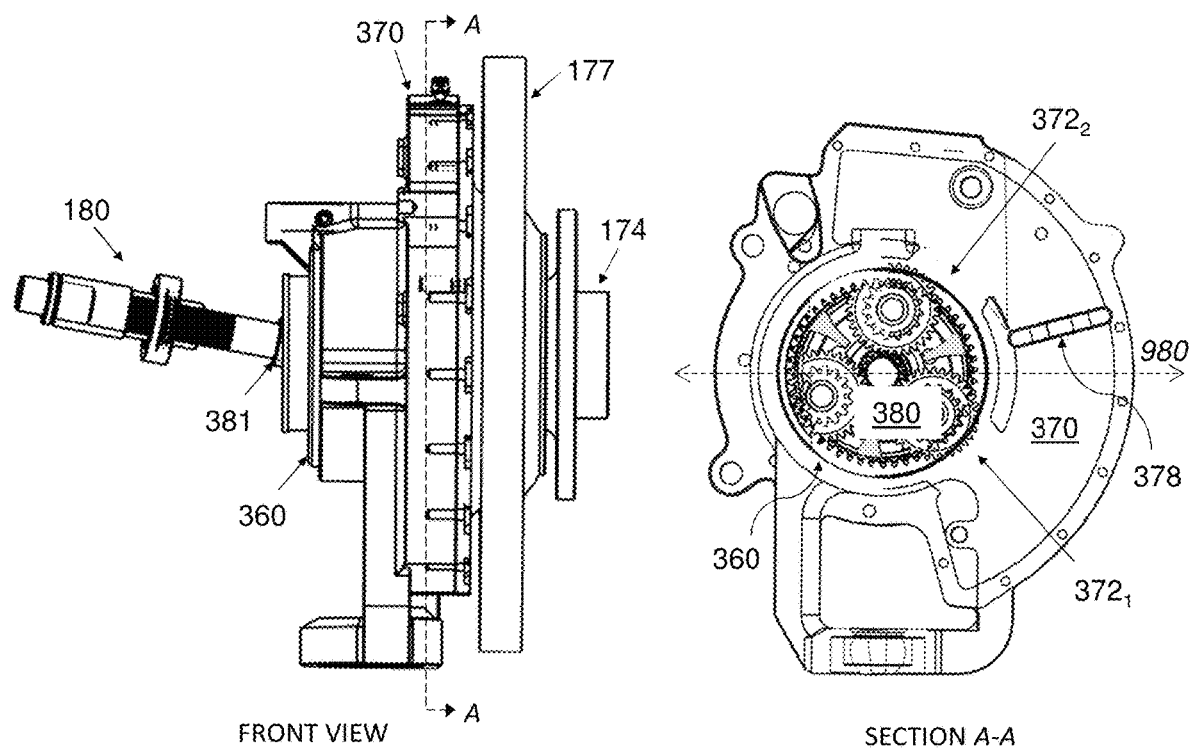
FRONT VIEW
FIG. 6A
SECTION A-A
FIG. 6B

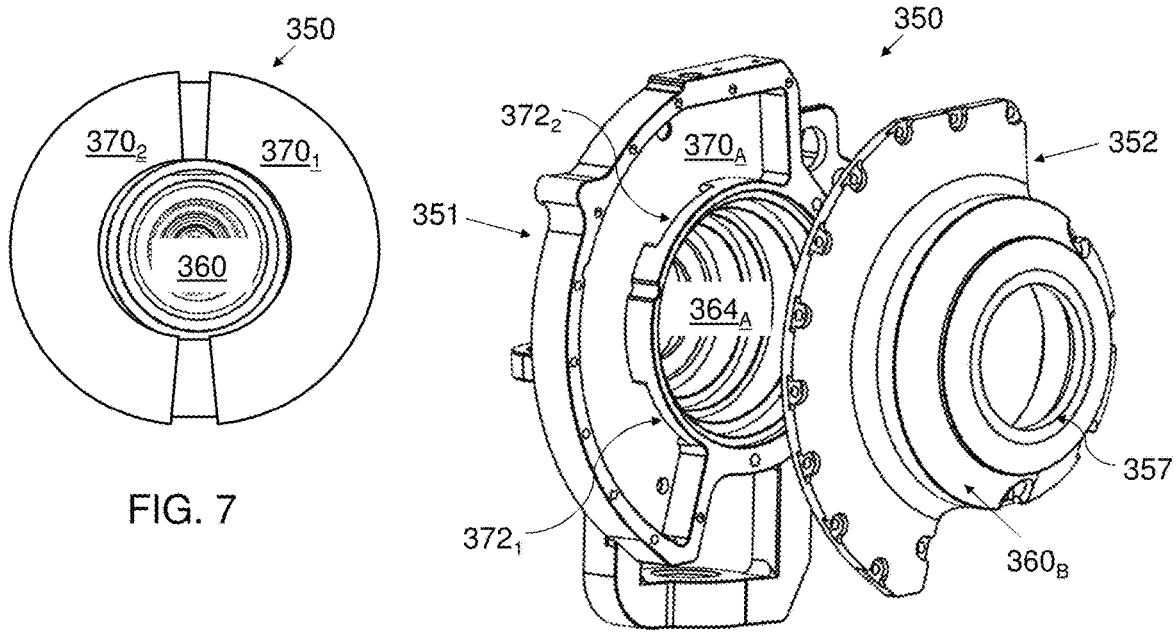
OUTWARD-FACING EXPLODED VIEW
FIG. 8A
FIG. 7
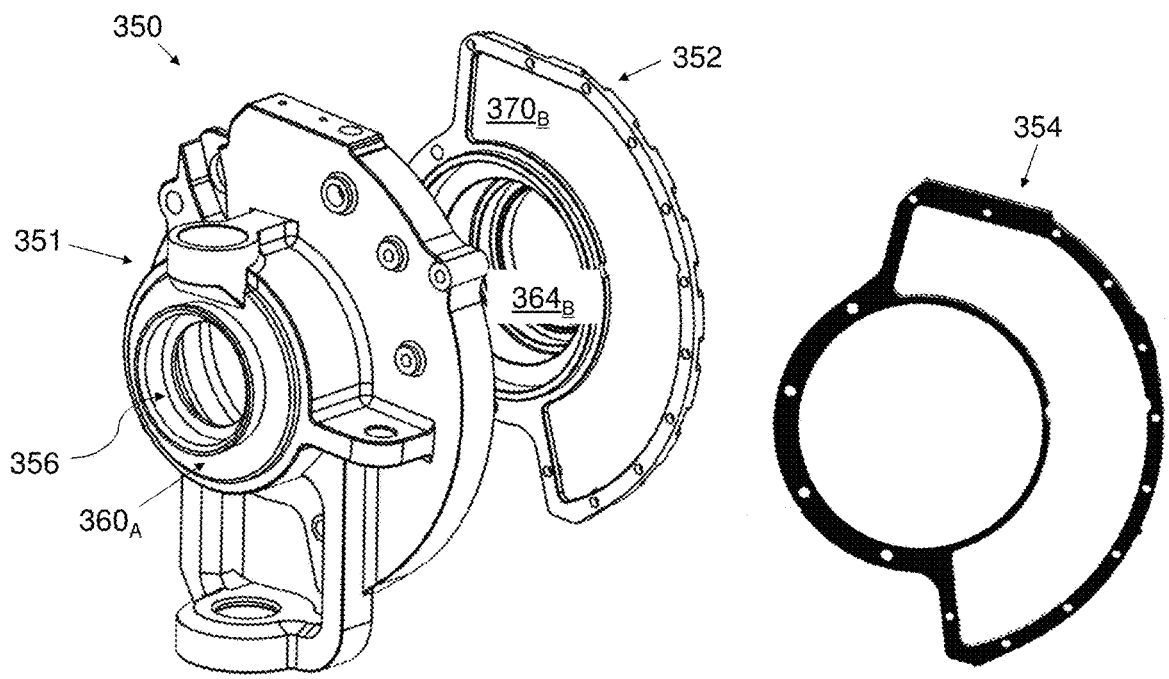
INWARD-FACING EXPLODED VIEW
FIG. 8B
FIG. 9

OUTWARD-FACING VIEW

PARTIAL FRONT VIEW

REAR VIEW

WHEEL-HUB GEARS AND CASINGS THEREFOR

CROSS-REFERENCE TO RELATED APPLICATIONS

This patent application is a continuation of PCT application PCT/IB2021/060232, filed on Nov. 4, 2021, which is incorporated herein by reference in its entirety. PCT application PCT/IB2021/060232 claims the benefit of U.S. Provisional Patent Application No. 63/111,155, filed on Nov. 9, 2020, which is also incorporated herein by reference in its entirety.

FIELD OF THE INVENTION

The present invention relates to gearing assemblies for transmitting torque to drive wheels of vehicles and to casings therefor, and particularly to assemblies and casings for individually-geared drive wheels.

BACKGROUND

Vehicle drivetrains and gearing arrangements have been developed and improved over the course of more than a century, resulting in sophisticated designs that serve to distribute forces to the various wheels of a vehicle.

There is a need for a compact powertrain gear mounted to the wheel hub to motorize the wheel. A compact gear may be defined as such having minimum lateral size to allow other wheel assembly components within the volume of the wheel and between the wheel and the vehicle chassis. There are examples of gears coupled to a wheel hub, which are either too long, integrated with a motor within the volume of the wheel, and/or have a low reduction ratio between the motor and the wheel hub. Some such gear arrangements are lubricated by using a wet sump, wherein a space below the gear is required for oil reservoir and an oil pump is used for oil circulation. Some gear arrangements are lubricated by using a dry sump and oil pump (e.g. scavenge pump) to supply oil to the gear. There is therefore a need for a compact wheel-hub gear that is self-lubricated, i.e., without a pump, by an amount of oil in a range that provides sufficient lubrication without overflowing the gear.

SUMMARY

According to embodiments of the invention, a gear casing for a wheel-hub assembly comprises: (a) a gear housing comprising a drive-gear volume for accommodating therewithin a gearing assembly that is positioned to mediate between a drivetrain member and a wheel-hub member, the drive-gear volume being in fluid communication with opposing first and second openings formed in the gear housing for respective gearing-assembly connections therethrough with the drivetrain member and the wheel hub member; and (b) a lubricant compartment radially displaced from the drive-gear volume and in fluid communication therewith exclusively via an array of one or more lubricant passages disposed circumferentially around a portion of the gear housing, the lubricant-passage array arranged for flow therethrough of a gearing-assembly lubricant between the lubricant compartment and the gear housing.

In some embodiments, the gear casing can comprise a plurality of casing portions, wherein at least one of the gear housing and the lubricant compartment is formed by a joining of at least two of the plurality of casing portions, each of the joined casing portions comprising at least a part of a respective interior surface of at least one of the gear housing and the lubricant compartment. In some such embodiments, both the gear housing and the lubricant compartment can be formed by the joining. In some embodiments, the lubricant-passage array can be formed exclusively in one joined casing portion. In some embodiments, the plurality of casing portions can include a gasket interposed between two other casing portions of the plurality of casing portions, and/or the lubricant-passage array can be formed in the gasket.

In some embodiments, the lubricant-passage array can comprise a plurality of discrete lubricant passages. In some such embodiments, a bottommost one of the lubricant passages can be disposed to be at least in part below a central axis of the gearing assembly, and/or a topmost one of the lubricant passages can be disposed to be at least in part above the central axis of the gearing assembly. In some embodiments, at least a part of the bottommost lubricant passage can be lower than a lowest part of the drive-gear volume. In some embodiments, the gear casing can be arranged such that a majority of a lubricant-flow through a bottommost lubricant passage is from the lubricant compartment to the gear housing, and/or a majority of a lubricant-flow through a topmost lubricant passage is from the gear housing to the lubricant compartment.

In some embodiments, the gear casing can be configured such that all lubricant flows between the lubricant compartment and the gear housing are due to forces generated by operation of the gearing assembly and/or external forces acting upon the wheel-hub assembly.

In some embodiments, the gear casing can additionally comprise, within the lubricant compartment, a flow-regulation element.

In some embodiments, the gear casing can additionally comprise a first connection portion adapted for connection to a suspension arm of a wheel assembly and a second connection portion adapted for connection to a steering-system member of the wheel assembly.

In some embodiments, the gear casing can comprise a plurality of lubricant compartments radially displaced from the drive-gear volume, each lubricant compartment being in fluid communication therewith exclusively via a respective array of one or more lubricant passages disposed circumferentially around a portion of the gear housing, the respective lubricant-passage arrays being arranged for flow therethrough of a gearing-assembly lubricant between the lubricant compartment and the gear housing.

According to embodiments, a wheel assembly can comprise (a) the gear casing of any of the embodiments disclosed hereinabove, and/or (b) the gearing assembly positioned to mediate between the drivetrain member and the wheel-hub member, the gearing assembly disposed within in the gear casing and comprising a compound planetary gear train comprising (i) a sun gear in bearinged connection with the drivetrain member of the vehicle so as to be rotated thereby, (ii) a carrier in bearinged connection with the wheel-hub member, and/or (iii) a plurality of composite planet gears each having multiple radii. In some such embodiments, the bearinged connection with the wheel-hub member can be via a wheel-hub bearing assembly interiorly attached to the gear casing. In some embodiments, the planet gears can be meshed with a ring gear interiorly attached to the gear casing.

In some embodiments, the wheel assembly can additionally comprise: (a) a sub-frame configured to be mounted to a reference frame of a vehicle; (b) a suspension arm linking the sub-frame to a first connection portion of the gear casing; and/or (c) a steering system member connected distally to a second connection portion of the gear casing and configured to rotate the wheel-hub member about a steering axis.

In some embodiments, the wheel assembly can additionally comprise the drivetrain member, the wheel-hub member coupled to the gearing assembly, and/or a brake assembly coupled to the wheel-hub member, the brake assembly being characterized by having a brake caliper connected thereto, wherein a thickness of the gear housing through the drive-gear volume is less than 120% of a width of the brake caliper, the thickness and the width both being in a direction parallel to a central axis of the gearing assembly. In some such embodiments, a thickness of the gearing assembly can be less than 110% of a width of the brake caliper, the thickness and the width both being in a direction parallel to a central axis of the gearing assembly. In some embodiments, the gearing assembly can be disposed entirely between the wheel-hub member and a plane defined by an inward-facing rim of a wheel mounted to the wheel-hub member.

According to embodiments, a vehicle can comprise: a pair of opposing wheel assemblies, the wheel assemblies being according to any of the embodiments disclosed hereinabove, a corresponding pair of wheels, and/or the reference frame. In some embodiments, the lubrication compartment of the gear casing of each wheel assembly can be displaced from the respective drive-gear volume so as to be forward of the gearing assembly.

According to embodiments of the invention, a gear casing comprises first and second gear-casing portions joined to each other to form (i) a gear housing comprising a drive-gear volume for accommodating therewithin a gearing assembly that is positioned to mediate between a drivetrain member and a wheel-hub member, and (ii) a lubricant compartment for storing a quantity of a gearing-assembly lubricant, the lubricant compartment radially displaced from the drive-gear volume and in fluid communication therewith exclusively via an array of one or more lubricant passages arranged circumferentially around a portion of the gear housing.

In some embodiments, the array of lubricant-passages can be formed exclusively in a specific one of the first and second joined gear-casing members.

In some embodiments, a first gear-casing portion can comprise a first connection portion adapted for connection to a suspension arm of a wheel assembly and a second connection portion adapted for connection to a steering-system member of the wheel assembly.

In some embodiments, a thickness of the lubrication compartment can be less than half a thickness of the gear housing through the drive-gear volume, both of the thicknesses being in a direction parallel to a central axis of the gearing assembly.

In some embodiments, the gear casing can additionally comprise a brake assembly characterized by having a brake caliper connected thereto, wherein a thickness of the gear housing through the drive-gear volume is less than 120% of a width of the brake caliper, the thickness and the width both being in a direction parallel to a central axis of the gearing assembly.

According to embodiments, an assembly can comprise (a) the gear casing according to any of the embodiments disclosed hereinabove, and/or (b) the gearing assembly positioned to mediate between the drivetrain member and the wheel-hub member, the gearing assembly disposed within the gear casing and comprising a compound planetary gear train comprising (i) a sun gear in bearinged connection with the drivetrain member of the vehicle so as to be rotated thereby, (ii) a carrier in bearinged connection with the wheel-hub member, and/or (iii) a plurality of composite planet gears each having multiple radii.

In some embodiments, a thickness of the gearing assembly can be less than 110% of a width of the brake caliper, the thickness and the width both being in a direction parallel to a central axis of the gearing assembly.

In some embodiments, the bearinged connection with the wheel-hub member can be via a wheel-hub bearing assembly interiorly attached to the gear casing.

In some embodiments, the planet gears cam be meshed with a ring gear interiorly attached to the gear casing.

According to embodiments of the present invention, an assembly comprises (a) a gearing assembly for transmitting rotation to a wheel of a vehicle, and (b) a gear housing for housing the gearing assembly therein, the gearing assembly comprising a compound planetary gear train configured (i) for a sun gear thereof to be in bearinged connection with a drivetrain member of the vehicle so as to be rotated thereby, and/or (ii) for a carrier thereof to be in bearinged connection with a wheel-hub member of the vehicle so as to rotate the wheel-hub member, the bearinged connection with the wheel-hub member being via a wheel-hub bearing assembly interiorly attached to the gear housing, the sun gear and the carrier being rotatably linked by a plurality of composite planet gears each (i) having multiple radii and arranged to rotate the carrier, and/or (ii) meshed with a ring gear interiorly attached to the gear housing.

According to embodiments of the invention, a wheel assembly comprises: (a) a gearing assembly comprising a compound planetary gear train configured (i) for a sun gear thereof to be in bearinged connection with a drivetrain member of the vehicle so as to be rotated thereby, and/or (ii) for a carrier thereof to be in bearinged connection with a wheel-hub member of the vehicle so as to rotate the wheel-hub member, the sun gear and the carrier being rotatably linked by a plurality of composite planet gears each having multiple radii and arranged to rotate the carrier; and (b) a gear casing comprising: (i) a gear housing comprising a drive-gear volume accommodating therewithin the gearing assembly, the gearing assembly positioned to mediate between a drivetrain member and a wheel-hub member, the drive-gear volume being in fluid communication with opposing first and second openings formed in the gear housing for respective gearing-assembly connections therethrough with the drivetrain member and the wheel hub member; and (ii) one or more lubricant compartments radially displaced from the drive-gear volume, each one of the one or more lubricant compartments being in fluid communication with the drive-gear volume exclusively via a respective array of one or more lubricant passages disposed circumferentially around a respective portion of the gear housing, each lubricant-passage array arranged for flow therethrough of a gearing-assembly lubricant between the respective lubricant compartment and the gear housing.

In some embodiments, the wheel assembly can additionally comprise the wheel-hub member, wherein the gearing assembly is disposed entirely between the wheel-hub member and a plane defined by an inward-facing rim of a wheel mounted to the wheel-hub member.

BRIEF DESCRIPTION OF THE DRAWINGS

The invention will now be described further, by way of example, with reference to the accompanying drawings, in which the dimensions of components and features shown in the figures are chosen for convenience and clarity of presentation and not necessarily to scale. In the drawings:

FIGS. 5A and 5B are, respectively, inward-facing and outward-facing elevation views of an assembly comprising the gear casing of FIGS. 3A-B and the gearing assembly of FIGS. 4A-B.

FIG. 6A is a schematic front-view drawing of the assembly of FIGS. 5A-5B, also having connected a driveshaft, a brake assembly and a wheel-hub member, according to embodiments of the present invention.

FIG. 6B is a sectional inward-facing view of the assembly of FIG. 6A, according to embodiments of the present invention.

FIG. 7 is a schematic drawing of a gear casing comprising a gear housing and two lubrication compartments, according to embodiments of the present invention.

FIGS. 8A and 8B are exploded views of a gear casing formed by joining two portions, according to embodiments of the present invention.

FIG. 9 is a schematic drawing of a gasket for sealing between two joined portions of a gear casing, according to embodiments of the present invention.

DETAILED DESCRIPTION OF THE ILLUSTRATED EMBODIMENTS

Figure 1:
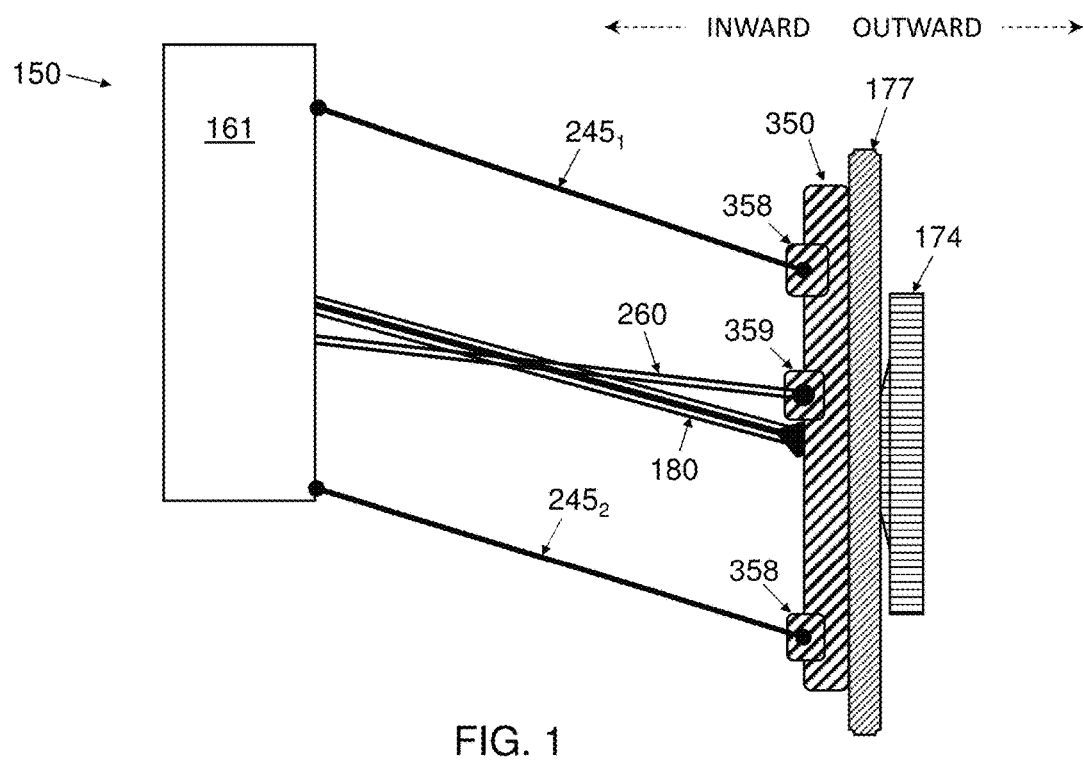
FIG. 1 is a schematic front-view drawing of a left wheel assembly according to embodiments of the present invention.

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are generally used to designate like elements.

Note: Throughout this disclosure, subscripted reference numbers (e.g., $10_1$ or $10_A$) may be used to designate multiple separate appearances of elements of a single species, whether in a drawing or not; for example: $10_1$ is a single appearance (out of a plurality of appearances) of element 10. The same elements can alternatively be referred to without subscript (e.g., 10 and not $10_1$) when not referring to a specific one of the multiple separate appearances, i.e., to the species in general.

For convenience, in the context of the description herein, various terms are presented here. To the extent that definitions are provided, explicitly or implicitly, here or elsewhere in this application, such definitions are understood to be consistent with the usage of the defined terms by those of skill in the pertinent art(s). Furthermore, such definitions are to be construed in the broadest possible sense consistent with such usage.

Embodiments of the present invention include the provision of gearing assemblies for wheels of a vehicle, i.e., each geared wheel is paired with a gearing assembly that mediates between a driveshaft or other drivetrain member and the respective wheel hub of the wheel. The driveshaft transmits a torque from a motor (for example, an electric motor) to rotate a first gear or group of gears of the gearing assembly, for example via a constant-velocity joint or other suitable arrangement. The gearing assembly is designed to transmit torque to the wheel hub, e.g., at a reduced speed or rotation relative to the received torque. In preferred designs, the motor is associated with a reference frame of the vehicle or with a modular sub-frame mounted thereto, such that the motor is 'sprung' with respect to the vehicle's suspension system. On the other hand, the gearing assembly, which is preferably in close connection with the wheel hub and wheel, is typically 'unsprung' weight. In addition, an independently-driven and/or independently-suspended and/or independently-steered wheel is typically integrated in a wheel assembly with many moving parts in a relatively small space. Thus it can be desirable for the gearing assembly, and a gear housing provided to accommodate the gearing assembly, to be both compact and lightweight.

Unless otherwise indicated, a 'wheel assembly' as used herein means an assembly for supporting a wheel of a vehicle according to any of the embodiments disclosed herein and wheel-assembly components such as (and not exhaustively): gearing assemblies, gear casings and lubrication arrangements; steering systems and suspension systems; wheel hubs, brake systems, and driveshafts. A wheel assembly can be mounted to a 'reference frame' of a vehicle, e.g., a chassis or similar vehicle frame, although the mounting need not necessarily be done 'as a unit'. A wheel assembly may include a 'sub-frame' to which some or all of the assembly components are mounted or otherwise attached such that the sub-frame mediates between the reference frame and the various wheel assembly components. The term 'sub-frame' should be understood to mean any rigid frame or one or more structural elements in fixed combination. The 'sub' prefix is intended to distinguish the sub-frame from a main frame or reference frame of the vehicle. A wheel assembly may or may not include an electric motor and/or the wheel itself.

When used in this specification and in the claims appended hereto, the word 'vehicle' is to be understood as referring to a motorized vehicle having one or more wheels. Non-limiting examples of a vehicle, according to this definition, are a vehicle with motive power provided by an onboard engine, and an 'electric vehicle' powered, when in motion, by one or more electric motors and a battery or other energy storage device onboard. The battery need not be provided with the vehicle, or installed in the vehicle, unless and until the vehicle is in motion. The word 'vehicle' should also be understood as encompassing a "vehicle platform" comprising at least a chassis (or other 'reference frame' to which wheel assemblies can be mounted) and one or more wheels. A 'vehicle platform' need not necessarily comprise, at the time of providing the vehicle platform, all of the accoutrements required for transport of passengers and/or cargo such as vehicle-body components or interior furnishings.

According to embodiments disclosed herein, a compact, lightweight gear casing for housing therein a gearing assembly can serve as a wheel interface, or 'upright', supporting a wheel-hub assembly that comprises one or more wheel-hub members. The gear casing can be designed to make a connection with a steering rod, e.g., a 'pushrod', and in this way the gear casing can transmit a steering torque from the steering rod to the wheel-hub assembly so as to rotate the wheel around a steering axis. Additionally or alternatively, the gear casing can be designed to receive one or more bearing arrangements, including, in a non-limiting example, ball joints, so as to make a bearinged connection with one or more respective suspension-assembly members.

As will be described in further detail hereinbelow, the size and weight of the gear casing and gearing assembly can be reduced relative to prior art designs. Inter alia, this can be accomplished by integrating a compact, lightweight gear-lubrication arrangement in the gear casing, and in particular an arrangement for pumpless oil lubrication. The term 'pumpless' means without a specific or dedicated pump component; in a pumpless configuration, internal flow and circulation of oil are substantially due to forces generated by operation of the gearing assembly itself and/or external forces acting upon the wheel-hub assembly. Inter alia, this can be accomplished by minimizing the size and weight of the gearing assembly by employing a compound planetary gear train design.

Referring now to the figures and in particular to FIG. 1, a wheel assembly 150 for a vehicle comprises a gear casing 350 according to any of the embodiments disclosed herein. In embodiments, the gear casing 350 has a gearing assembly (not seen in FIG. 1) installed therein for transmitting torque from a driveshaft member 180 to a wheel-hub member 174. In some embodiments, the gear casing 350 serves as the upright of the wheel assembly and as such supports the wheel-hub member 174. Serving as the upright, the gear casing 350 can also include a connection arrangement 358 for one or more suspension arms 245 and/or a connection arrangement 359 for a steering rod 260 (e.g., a pushrod). Connection arrangements 358, 359 can include joints or bearings as needed for specific implementations of the embodiments of the invention. In embodiments, the wheel assembly 150 includes a sub-frame 161 configured to be mounted to a reference frame, e.g., a chassis of a vehicle. In embodiments, the wheel assembly 150 also includes any or all of: one or more suspension arms 245 linking the gear casing 350 to the sub-frame 161; a steering rod 260 linking a steering actuator (not shown) to the sub-frame 161; and/or a driveshaft member 180 configured to rotate one or more components of the gearing assembly. In embodiments, the wheel assembly 150 can include a brake assembly 177, interposed between the gear casing 350 and the wheel-hub member 174.

In embodiments, wheel assemblies, including any or all of the components described hereinabove, can be provided in opposing pairs, or installed on a vehicle in opposing pairs. Thus, any illustration of a wheel assembly or a wheel-assembly component in the accompanying figures may be appropriate for installation on one side or the other of a vehicle, and a skilled artisan will understand that a 'mirror-image' implementation would be appropriate for the opposing side of the vehicle.

In embodiments, wheel assemblies as disclosed herein can be employed with wheels which are axle-less and/or independently-suspended. In some vehicles, it can be that a first opposing pair of wheels is axle-less and independently-suspended while a second opposing pair of wheels uses 'conventional' or 'prior-art' arrangements of an axle and suspension system. In other vehicles, it can be that all opposing pairs of wheels are axle-less and independently-suspended. Some vehicles may implement the disclosed embodiments with respect to wheel assemblies and steering systems only at a first pair of wheels as disclosed herein, and some other vehicles may implement the embodiments at all wheels.

Figure 2:
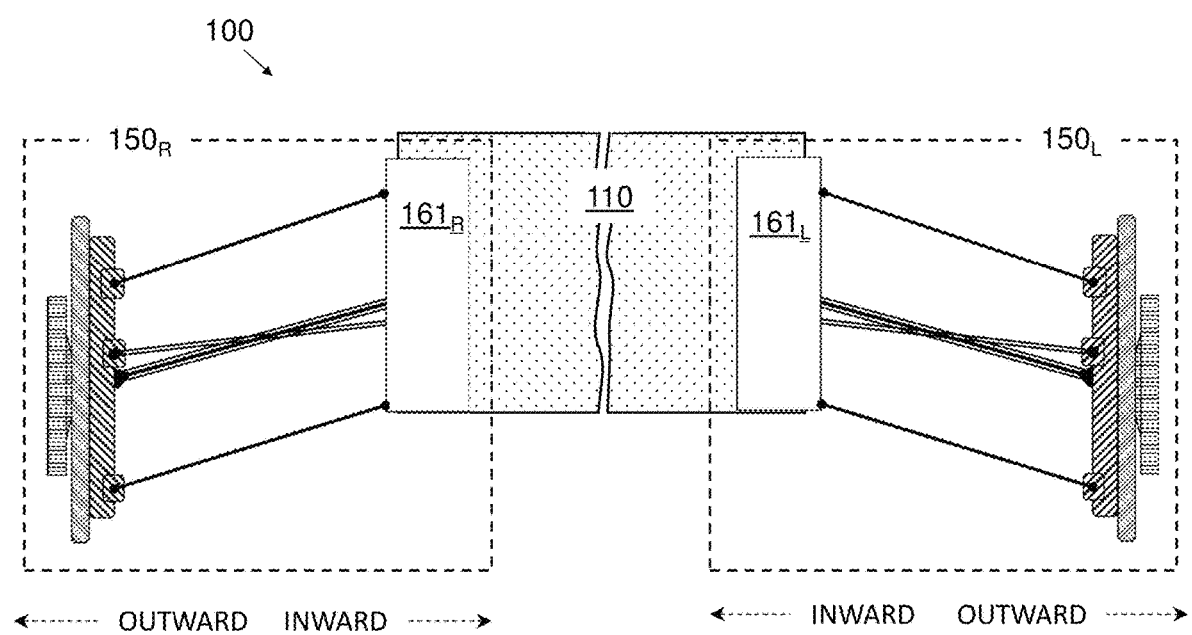
FIG. 2 is a schematic front-view of a portion of a vehicle comprising wheel assemblies according to embodiments of the present invention.

As illustrated in FIGS. 1 and 2, the term 'inward(s)' or the equivalent 'inward-facing' means a face or side facing towards the centerline of a vehicle, while the complementary term 'outward(s)' or the equivalent 'outward-facing' means facing away from the vehicle. For example, an 'inward-facing view' in the set of attached drawings is a view of a face that is inward-facing.

Referring now to FIG. 2, a vehicle 100 includes at least one pair of opposing wheel assemblies $150_R$, $150_L$ mounted to the vehicle, for example by mounting respective sub-frames $161_R$, $161_L$ to a reference frame 110, e.g., the chassis, of the vehicle. The right-side (on the left side in the front view illustrated in FIG. 2) wheel assembly $150_R$ is shown as a mirror image of the left-side wheel assembly $150_L$ of FIG. 1.

Figure 3A:
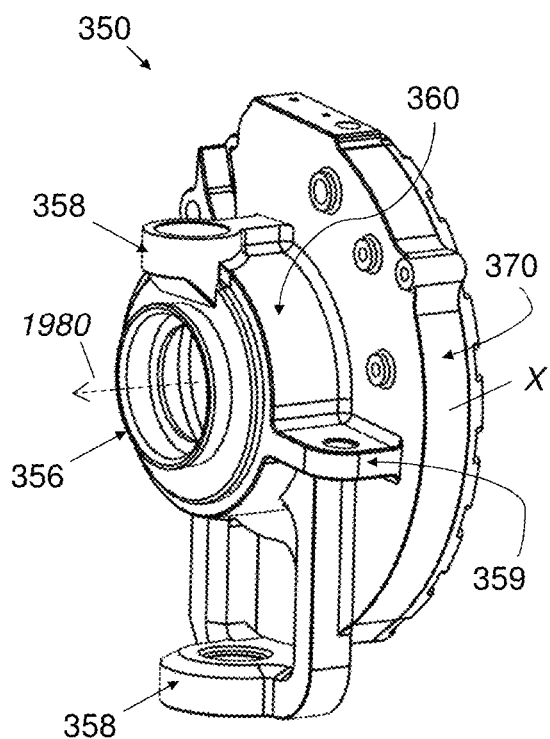
FIGS. 3A and 3B are, respectively, inward-facing perspective and front view schematic drawings of a gear casing comprising a gear housing and a lubrication compartment according to embodiments of the present invention.
Figure 3B:
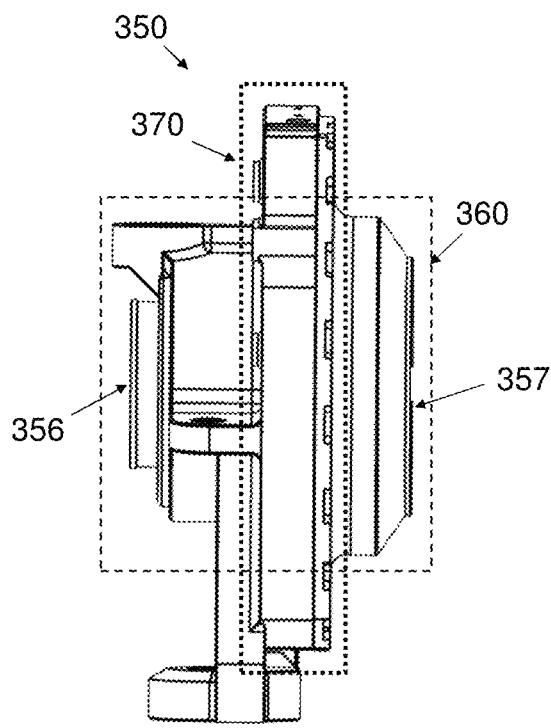

FIGS. 3A and 3B show two views of an exemplary gear casing 350 according to embodiments, in which features of an upright are incorporated in the design of the gear casing. The gear casing 350 comprises a gear housing 360 which has an internal space adapted for accommodating therein a compact gearing assembly (not shown in FIGS. 3A-B) and a lubricant compartment 370 for a liquid lubricant, e.g., an oil, radially displaced from the gear housing 360. A first opening 356, on the inward-facing side of the gear casing 350 is provided for making a connection therethrough between a drivetrain member (e.g., a driveshaft) and the gearing assembly. A second opening 357 is provided on the outward-facing side of the gear casing 350, for making a connection therethrough between a wheel-hub assembly member and the gearing assembly.

According to some embodiments, suspension connecting arrangements 358 are provided for bearinged connections with suspension arms. In some embodiments, suspension connecting arrangements 358 define a steering axis for the wheel. In some embodiments, any of the suspension connecting arrangements 358 can include one or more connection ports. In some embodiments, the wheel is steerable, and a steering rod connection arrangement 359 is provided for connecting with a steering rod. In some embodiments, one or more connection arrangements 358, 359 is/are formed at the gear housing 360 at a given radial distance from a central longitudinal axis (indicated in FIG. 3A by arrow 1980) of the gear housing 360, wherein the given distance from the central axis 1980 is less than a radial distance to a periphery of the lubricant compartment 370. For example, the steering rod connection 359 of FIG. 3A is at a radial distance from central axis 1980 less than a radial distance to the point marked with an 'X' on the outer periphery of the lubrication compartment 370.

Figure 4A:
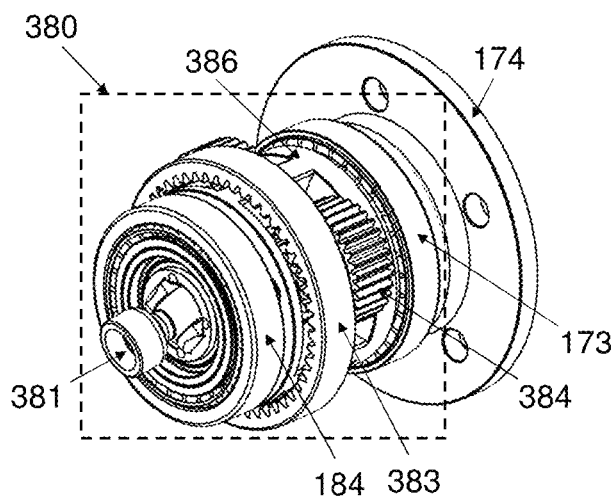
FIGS. 4A and 4B are, respectively, inward-facing perspective and inward-facing elevation views of a gearing assembly according to embodiments of the present invention.
Figure 4B:
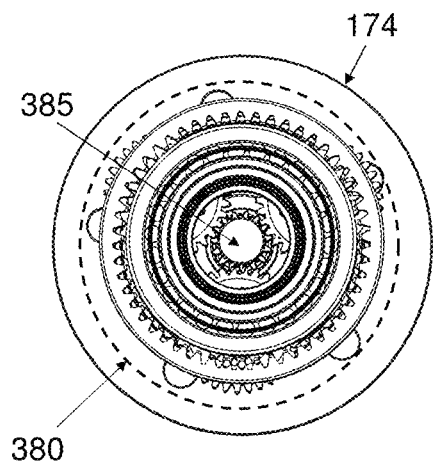

A non-limiting example of a compact gearing assembly 380 comprising a compound planetary gear system is illustrated in FIGS. 4A-B. A constant-velocity (CV) joint 381 is provided for engagement with a drivetrain member, e.g., a driveshaft (not shown), although in other examples other types of joints (other than CV joints) can be suitable for mediating between the driveshaft and the gearing assembly 380. The driveshaft is arranged, e.g., via the CV joint 381, to turn the sun gear 385 (shown in FIG. 4B) of the planetary gear system. The sun gear 385 is engaged (i.e., meshed) with a first section of each of a plurality of composite planet gears 384 mounted to and supported by a planet-gear carrier 386. The composite planet gears 384 are arranged so that the first section of each planet gear 384 has a first radius and a second section of each planet gear 384 has a second radius. In the example shown in FIG. 4A, the second radius is smaller than the first radius, and the second section of each planet gear 384 is engaged with a ring gear 383. The second section is disposed inwardly of the first section (meaning that the second section is closer to the first opening 356 of FIGS. 3A-B when installed in the gear housing 360 than is the second section), such that the ring gear 383 is also disposed inwardly from the portion of the sun gear 385 that engages with the planet gears. The compact gearing assembly 380 of FIGS. 4A-B is configured to operate as follows: 1. Torque applied by the driveshaft (180, not shown in FIGS. 4A-B) via, e.g., a CV joint 381, causes the sun gear 385 to rotate. 2. The rotation of the sun gear 385 causes the planet gears 384 to rotate. 3. The rotation of the planet gears causes the plurality of planet gears 384 to 'orbit' the sun gear 385 around the interior of the ring gear 383 (which, in some embodiments, is interiorly attached to the gear housing 360). 4. The orbiting of the plurality of planet gears 384 rotates the planet-gear carrier 386. 5. The planet-gear carrier 386 is mechanically coupled with the wheel-hub member 174, and therefore the rotation of the planet-gear carrier 386 turns the wheel of the vehicle. The gearing assembly 380 of FIG. 4A also includes a drive shaft support bearing 184 and/or a wheel-hub bearing 173 in respective inwardly-disposed and outwardly-disposed bearinged contact with the rotating planet gear carrier 386. The drive shaft support bearing 184 is configured to support the driveshaft and/or CV joint 381 and/or mediate between an inwardly-disposed portion of the rotating planet gear carrier 386 and the gear housing 360. The wheel-hub bearing 173 is interiorly attached to the gear casing 360 to mediate between an outwardly-disposed portion of the rotating planet gear carrier 386 and the gear housing 360.

FIGS. 5A-B show the gear casing 350 of FIGS. 3A-B, with the compact gearing assembly 380 of FIGS. 4A-B installed in the gear housing 360. FIG. 6A shows the same assembly of the gear casing 350 with the gearing assembly 380 as was shown in FIGS. 5A-B, along with drivetrain member 180 connected to CV joint 381, and a typical brake assembly 177 interposed between the gear housing 360 and the wheel-hub member 174. In an example, the maximal radius of gear casing 350 is equal to or smaller than the maximal radius of a brake assembly 177. FIG. 6B is a cross-sectional view (view A-A indicated in FIG. 6A) of the same assembly. The interior volume of the lubrication compartment 370 is radially displaced from the gear housing 360 and from the gearing assembly 380 housed within.

It can be desirable to use a liquid lubricant (oil) and not a grease for lubricating the gearing assembly 380, inter alia in order to optimize gear performance and life-cycle cost. During operation of the gearing assembly 380, liquid lubricant (e.g., an organic or non-organic oil) circulates between the lubrication compartment 370 and the drive-gear volume 364 to lubricate the gearing assembly, where the circulation results from gear operation and external forces acting upon the gear casing 350, i.e., without deploying a mechanical pump for oil circulation. The lubrication compartment 370 is in fluid communication with an interior 'drive-gear volume' 364 (illustrated in FIGS. 8A-B) of the gear housing 360 via—in some embodiments: exclusively via—one or more lubrication passages 372. In some embodiments, a dimension and/or position of one or more lubrication passages 372 is based on optimizing one or more of (and not exhaustively): lubricant quantity in the lubricant compartment 370; required lubricant flow to and/or from the drive-gear volume 364;

sump volume and position; and design of the gearing assembly 380. In some embodiments, there is a single continuous lubrication passage 372 (not shown). In an example, a single continuous lubrication passage 372 extends circumferentially from a point at the lower end of bottommost lubrication passage $372_1$ in FIG. 6B and/or to a point at the upper end of topmost lubrication passage $372_2$ in FIG. 6B. In another example, a single continuous lubrication passage 372 extends circumferentially from any point along the length of bottommost lubrication passage $372_1$ and/or to any point along the length of topmost lubrication passage $372_2$. In another example, a single continuous lubrication passage 372 extends circumferentially from any point below the lower end of bottommost lubrication passage $372_1$ and/or to any point along the length of topmost lubrication passage $372_2$. In embodiments, two or more discrete lubrication passages 372 are provided. In the non-limiting example of CFIG. 6B (and FIG. 8A), two discrete lubrication passages $372_1$, $372_2$ are provided, where a bottommost lubrication passage $372_2$ is arranged to be entirely below a 'half-height level' (indicated by arrow 980) corresponding to a central longitudinal axis of the gearing assembly 380 i.e., to half the height of the gearing assembly 380. In other examples, the bottommost lubrication passage $372_1$ extends circumferentially from a point below the half-height level 980 to a point above the half-height level 980. In other examples involving multiple lubricant passages 372, a bottommost one of the lubricant passages, e.g., passage $372_1$, is disposed to be at least in part below the half-height level 980 corresponding to the central axis of the gearing assembly 380, and a topmost one of the lubricant passages, e.g., passage $372_2$, is disposed to be at least in part above the central axis of the gearing assembly 380.

One or more flow-regulation devices 378, e.g., a baffle, can be provided within the lubrication compartment 370, typically (as shown in FIG. 6B) but not necessarily above the halfway height 980. The flow-regulation device 378 can have any number of oil-management functions, including, but not exhaustively: slowing the return of oil from the drive-gear volume 364 to the lubrication compartment 370; de-foaming the returning oil; and/or filtering the returning oil.

In the example of FIGS. 3A-B, 5A-B and 6A-B, the design of the gear casing 350 calls for a single lubrication compartment 370. In some embodiments, the single lubrication compartment 370 is located forward of the gear housing 360. A forward-located lubrication compartment 370 may facilitate functional requirements, for example for connecting to a steering assembly, and/or for allowing enough space for a brake actuator. A forward-located lubrication compartment 370 may take advantage of the usual direction or rotation of the gearing assembly 380 (e.g., of the planet gear carrier 383) in facilitating the oil circulation regime in the absence of a dedicated mechanical pump. FIG. 7 shows an example of a gear casing 350 comprising two lubrication compartments $370_1$, $370_2$—one forward of the gear housing 360 and one aft. In some embodiments, the two lubrication compartments $370_1$, $370_2$ are fluidly connected with each other, directly and/or through the gear housing 360. Any or all of the features disclosed herein for a 'single-compartment' lubrication system, such as (and not exhaustively) lubrication passages and flow-regulation devices, are equally applicable in the 'dual-compartment' lubrication system of FIG. 7.

In embodiments, a gear casing 350 can be fabricated using any suitable technique or combination of techniques, such as casting, additive manufacturing, and/or subtractive manufacturing (e.g., machining, electro-erosion, etc.). According to some embodiments, a gear casing 350 comprises multiple portions, fabricated separately as component parts, and subsequently joined to form the gear casing 350. We now refer to FIGS. 8A-B, which schematically illustrate a non-limiting example of a gear casing 350 comprising two portions—first gear casing portion 351 which is substantially inward-facing, and second casing portion 352 which is substantially outward-facing. In other examples, a gear casing 350 comprises more than two portions. The two portions 351, 352 in the example of FIGS. 8A-B are designed such that neither one comprises a complete gear housing 360 or complete lubrication compartment 370. Instead, the first portion 351 comprises a first section $360_A$ of the gear housing 360 and first section $370_A$ of the lubrication compartment 370, while the second portion 352 comprises a second section $360_B$ of the gear housing 360 and a second section $370_B$ of the lubrication compartment 370. The joining of the two portions 351, 352 is thus effective to form both the gear housing 360 and the lubrication compartment 370. The drive-gear volume 364, which is configured to accommodate a gearing assembly 380, is similarly 'split' between the two portions 351, 352 such that the joining of the two portions 351, 352 forms the drive-gear volume 364. In other examples, a gear casing 350 comprises two portions that are dissimilar from the two portions 351, 352 of FIGS. 8A-B in any number of design aspects but which when joined together form the same gear casing 350. For example, the two portions 351, 352 can be designed so that a first one of the gear housing 360 and the lubrication compartment 370 is formed entirely in one of the two portions 351, 352, while the second one of the gear housing 360 and the lubrication compartment 370 is not, i.e., is split between the two portions 351, 352. Even among the design alternatives which split the gear housing 360 and the lubrication compartment 370 between the two portions 351, 352, an internal volume of the lubrication compartment 370 and/or of the gear housing 360 (i.e., the drive-gear volume 364) might, in an illustrative example, be formed entirely in one portion while the second portion has a flat 'cover' for the formed volume in the opposite portion. In embodiments, and as illustrated in FIG. 8A, the one or more lubrication passages 372 are formed entirely in one of the two portions 351, 352; in the illustrated example, they are formed exclusively in the first portion 351.

Joining the component portions of the gear housing 350, e.g., first and second portions 351, 352, can be accomplished using any of the known techniques such as fastening, welding, brazing, adhesive-bonding, or simply closing, e.g., with retaining elements such as nuts and bolts, or screws, on a sealant or on a gasket. FIG. 9 illustrates an exemplary gasket 354 suitable for use in joining the portions 351, 352 of FIGS. 8A-B. In some embodiments, the one or more lubricant passages 372 can be formed in the gasket 354 itself, additionally to or alternatively to lubricant passages 372 formed in one of the portions 351, 352.

Figures 10A, 10B, 10C:
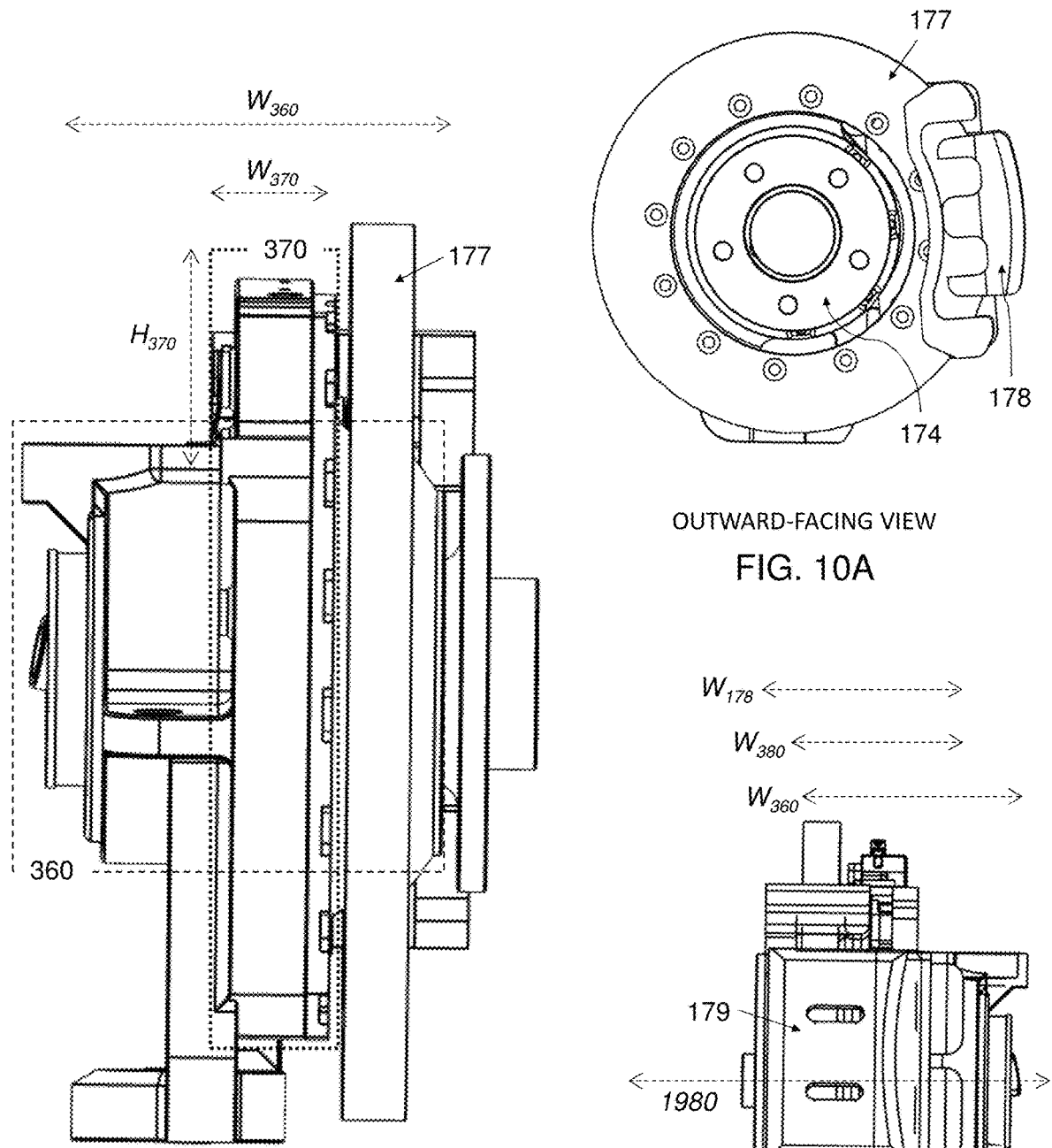
FIG. 10A is an outward-facing elevation view of the assembly of FIG. 6A, also having a brake caliper mounted to the brake assembly, according to embodiments of the present invention.
FIG. 10B is a partial front view of the assembly of FIG. 10A, indicating the respective widths of a gear housing and a lubricant compartment, according to embodiments of the present invention.
FIG. 10C is a rear view of the assembly of FIGS. 10A-B, indicating the respective widths of the brake caliper, the gearing assembly and the gear housing, according to embodiments of the present invention.

Referring now to FIGS. 10A-C, an assembly of a gear casing 350 and a gearing assembly 380 is illustrated together with a wheel-hub member 174 and a brake assembly 177. A brake caliper 178 and associated caliper pistons 179 also shown, mounted to the brake assembly 177.

It can be desirable to design the lubrication compartment 370 so that its radial extension from the gear housing 360 (the dimension indicated in FIG. 10B by arrow $H_{370}$) along the circumference of the adjacent gear housing 360 substantially exceeds its thickness (the dimension indicated in FIG. 10B by the arrow $W_{370}$). Inter alia, this provides for an adequately long section of the circumference of the gear housing 360 to be in fluid communication with the drive-gear volume 364 without requiring too large a quantity of lubricant in the lubricant compartment 370. Thus, it can be desirable to achieve a minimal thickness $W_{370}$ to the extent practical. As shown in the partial front view of FIG. 10B, thickness $W_{370}$ can be less than half the thickness of the gear housing 360 (the dimension indicated in FIG. 10B by the arrow marked $W_{360}$). In some embodiments, the thickness $W_{370}$ is less than 45%, or less than 40%, or less than 35%, or less than one-third, or less than 30%, or less than one-quarter, of the thickness $W_{360}$.

While the gear housing 360 can thus have a thickness ($W_{360}$) that is 2 times, or 3 times, or more than 3 times the thickness of the lubrication compartment 370 ($W_{370}$), minimizing the thickness of the gear housing 360 itself can be useful for facilitating the integration of the gear casing 350 into a wheel assembly 150 where space can be scarce and where it can be desirable to minimize the 'unsprung' weight of these components. The thickness $W_{360}$ of the gear housing 360 is shown in the rear elevation view of FIG. 10C, where the thickness $W_{360}$ can be compared to the width of the brake caliper 178 (including caliper pistons 179), said width being the dimension indicated in FIG. 10C by the arrow $W_{178}$. Both of these dimensions are in a direction parallel to the central axis of the gearing assembly 380, which is indicated in FIG. 10C by the arrow marked 1980. (All widths and dimensions indicated in FIGS. 10B and 10C are parallel to the central axis 1980.) The thickness $W_{360}$ is less than 130% of the width $W_{178}$, or less than 110% of the width $W_{178}$, or less than 100% of the width $W_{178}$. The compactness of the gearing assembly 380 can be a key factor in designing a gear housing 360 with a minimal thickness. The thickness of the gearing assembly 380, the dimension indicated in FIG. 10C by the arrow $W_{380}$, is less than 120% of the thickness of the width $W_{178}$, or less than 110% of the width $W_{178}$, or less than 100% of the width $W_{178}$, or less than 90% of the width $W_{178}$.

Figure 11:
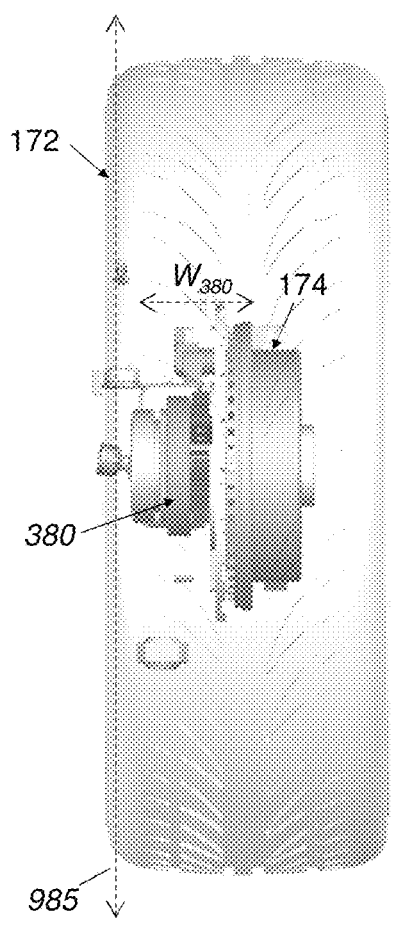
FIG. 11 is a schematic cutaway front view of the assembly of FIGS. 5A-B also having connected a wheel-hub member and mounted to a wheel, indicating the respective widths of the gearing assembly and the wheel, according to embodiments of the present invention.

Referring now to FIG. 11, a gearing assembly 380 according to embodiments is illustrated within a wheel 172 having a tire mounted on the wheel rim (not shown in FIG. 11 because it is obscured by the tire), the wheel 172 being mounted to wheel-hub member 174. It can be seen that the compact gearing assembly 380 is positioned, inter alia for space-saving purposes, in its entirety between the wheel-hub member 174 and a plane defined by an inward-facing rim (not shown) of a wheel mounted to the wheel-hub member 174, the plane of the rim being indicated in FIG. 11 by the arrow marked 985.

Figure 13:
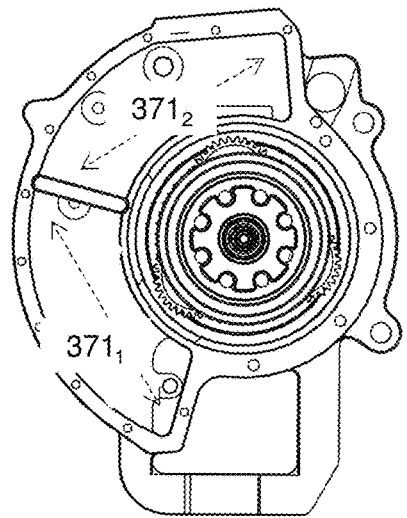
FIG. 13 shows the cutaway assembly view of FIG. 12, indicating sections of a lubricant compartment according to embodiments of the present invention.
Figure 12:
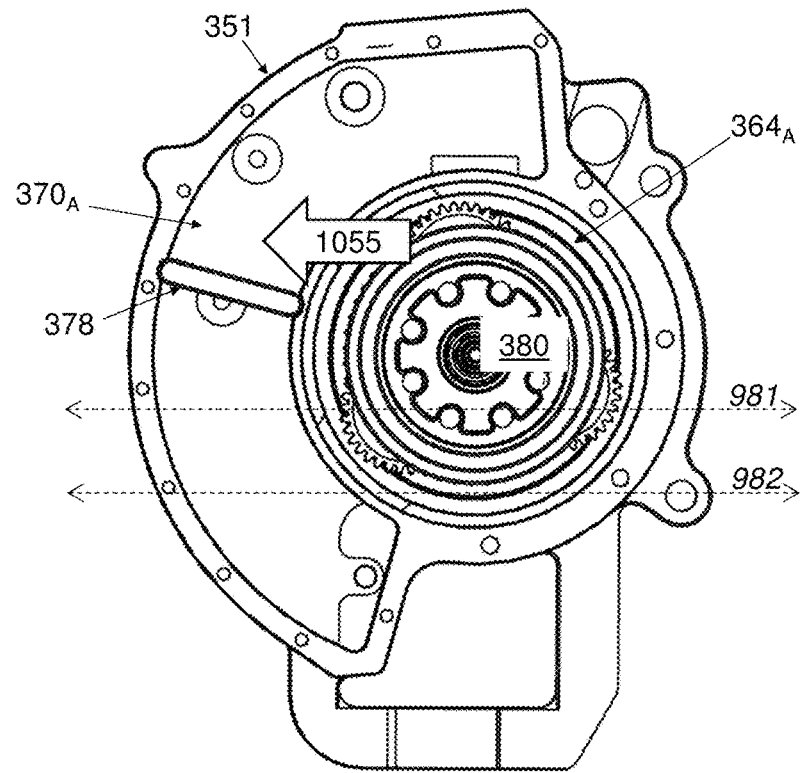
FIG. 12 is a schematic, cutaway outward-facing view of the assembly of FIGS. 5A-5B, indicating a prevailing lubricant flow direction and a lubricant level, according to embodiments of the present invention.

FIG. 12 is a schematic drawing of a first portion 351 of a gear casing 350 together with a gearing assembly 380 placed within the corresponding first-portion section $364_A$ of drive-gear volume 364. In embodiments, a minimum level of lubricant oil is maintained in the lubricant compartment 370 (the corresponding first-portion part $370_A$ is shown in FIG. 12). In some embodiments, optimal performance of the gear is achieved when a suitable level of lubricant level is maintained, i.e., when the gearing assembly is not operating. This suitable level, indicated in FIG. 12 by arrow 981, is between 20% and 50% of the height of the gearing assembly 380, i.e., the distance between the bottom of the gear (indicated in FIG. 12 by arrow 982) and the suitable level 981. In some embodiments, the suitable level is between 25% and 45% of the gear height, and in other embodiments between 30% and 40% of the gear height, or about one-third of the gear height. As described hereinabove, an array of one or more lubricant passages 172 is disposed circumferentially around a portion of the gear housing 360, the lubricant-passage array arranged for flow therethrough of a lubricant oil (for lubrication of the gearing assembly 380) between the lubricant compartment 370 and the gear housing 360. In embodiments in which the array comprises two or more lubricant passages 372, a suitable maintained level of lubricant level is at the height of the top of the bottommost lubricant passage, e.g., passage $372_1$ of FIG. 8A, or within ±1 cm thereof or within ±2 cm thereof. In some embodiments in which the array comprises two or more lubricant passages 372, a majority of lubricant flow through the topmost lubricant passage, e.g., passage $372_2$ of FIG. 8A, during gear operation is oil 'returning' from gear housing 360 to the lubricant compartment 370, a direction indicated by arrow 1055 in FIG. 12. The 'returning' to the lubricant department 370 can include, for example, flowing, splashing, and/or foaming. In embodiments in which the array comprises two or more lubricant passages 372, a suitable location for flow-regulating device 378 is below the topmost lubricant passage, e.g., passage $372_2$ of FIG. 8A. In an example illustrated in FIG. 13, the interior volume 371 of the lubricant compartment 370 comprises a lower section $371_1$ above the flow-regulating device 378 and an upper section $371_2$ above the regulating device 378. During normal gear operation, the upper section $371_2$ holds more residues from returning oil, air, and oil-air foam than the lower section $371_1$, while the lower section $371_1$ holds more liquid oil than the upper section $371_2$.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

In the description and claims of the present disclosure, each of the verbs, "comprise", "include" and "have", and conjugates thereof, are used to indicate that the object or objects of the verb are not necessarily a complete listing of members, components, elements or parts of the subject or subjects of the verb. As used herein, the singular form "a", "an" and "the" include plural references unless the context clearly dictates otherwise.

The invention claimed is:

1. A gear casing for a wheel-hub assembly, the gear casing comprising:
   a. a gear housing comprising a drive-gear volume for accommodating therewithin a gearing assembly that is positioned to mediate between a drivetrain member and a wheel-hub member, the drive-gear volume being in fluid communication with opposing first and second openings formed in the gear housing for respective gearing-assembly connections therethrough with the drivetrain member and the wheel hub member;
   b. a lubricant compartment radially displaced from the drive-gear volume and in fluid communication therewith exclusively via an array of one or more lubricant passages disposed circumferentially around a portion of the gear housing, the lubricant-passage array arranged for flow therethrough of a gearing-assembly lubricant between the lubricant compartment and the gear housing; and
   c. a plurality of casing portions, wherein at least one of the gear housing and the lubricant compartment is formed by a joining of at least two of the plurality of casing portions, each of the joined casing portions comprising at least a part of a respective interior surface of at least one of the gear housing and the lubricant compartment.

2. The gear casing of claim 1, wherein both the gear housing and the lubricant compartment are formed by the joining.

3. The gear casing of claim 1, wherein the lubricant-passage array is formed exclusively in one joined casing portion.

4. The gear casing of claim 1, wherein the plurality of casing portions includes a gasket interposed between two other casing portions of the plurality of casing portions, and the lubricant-passage array is formed in the gasket.

5. The gear casing of claim 1, wherein the lubricant-passage array comprises a plurality of discrete lubricant passages.

6. A gear casing for a wheel-hub assembly, the gear casing comprising:
   a. a gear housing comprising a drive-gear volume for accommodating therewithin a gearing assembly that is positioned to mediate between a drivetrain member and a wheel-hub member, the drive-gear volume being in fluid communication with opposing first and second openings formed in the gear housing for respective gearing-assembly connections therethrough with the drivetrain member and the wheel hub member; and
   b. a lubricant compartment radially displaced from the drive-gear volume and in fluid communication therewith exclusively via an array of one or more lubricant passages disposed circumferentially around a portion of the gear housing, the lubricant-passage array arranged for flow therethrough of a gearing-assembly lubricant between the lubricant compartment and the gear housing, wherein a bottommost one of the lubricant passages is disposed to be at least in part below a central axis of the gearing assembly, and a topmost one of the lubricant passages is disposed to be at least in part above the central axis of the gearing assembly.

7. The gear casing of claim 6, wherein at least a part of the bottommost lubricant passage is lower than a lowest part of the drive-gear volume.

8. The gear casing of claim 1, configured such that all lubricant flows between the lubricant compartment and the gear housing are due to at least one of: (i) forces generated by operation of the gearing assembly; and (ii) external forces acting upon the wheel-hub assembly.

9. A gear casing for a wheel-hub assembly, the gear casing comprising:
 a. a gear housing comprising a drive-gear volume for accommodating therewithin a gearing assembly that is positioned to mediate between a drivetrain member and a wheel-hub member, the drive-gear volume being in fluid communication with opposing first and second openings formed in the gear housing for respective gearing-assembly connections therethrough with the drivetrain member and the wheel hub member;
 b. a lubricant compartment radially displaced from the drive-gear volume and in fluid communication therewith exclusively via an array of one or more lubricant passages disposed circumferentially around a portion of the gear housing, the lubricant-passage array arranged for flow therethrough of a gearing-assembly lubricant between the lubricant compartment and the gear housing; and
 c. a plurality of lubricant compartments radially displaced from the drive-gear volume, each lubricant compartment being in fluid communication therewith exclusively via a respective array of one or more lubricant passages disposed circumferentially around a portion of the gear housing, the respective lubricant-passage being arrays arranged for flow therethrough of a gearing-assembly lubricant between the lubricant compartment and the gear housing.

10. A wheel assembly comprising:
 a. a gear casing comprising:
  i. a gear housing comprising a drive-gear volume for accommodating therewithin a gearing assembly that is positioned to mediate between a drivetrain member and a wheel-hub member, the drive-gear volume being in fluid communication with opposing first and second openings formed in the gear housing for respective gearing-assembly connections therethrough with the drivetrain member and the wheel hub member;
  ii. a lubricant compartment radially displaced from the drive-gear volume and in fluid communication therewith exclusively via an array of one or more lubricant passages disposed circumferentially around a portion of the gear housing, the lubricant-passage array arranged for flow therethrough of a gearing-assembly lubricant between the lubricant compartment and the gear housing;
 b. the gearing assembly positioned to mediate between the drivetrain member and the wheel-hub member, the gearing assembly disposed within in the gear casing and comprising a compound planetary gear train comprising (i) a sun gear in bearinged connection with the drivetrain member of the vehicle so as to be rotated thereby, (ii) a carrier in bearinged connection with the wheel-hub member, and (iii) a plurality of composite planet gears each having multiple radii;
 c. a sub-frame configured to be mounted to a reference frame of a vehicle;
 d. a suspension arm linking the sub-frame to a first connection portion of the gear casing; and
 e. a steering system member connected distally to a second connection portion of the gear casing and configured to rotate the wheel-hub member about a steering axis.

11. The wheel assembly of claim 10, wherein the bearinged connection with the wheel-hub member is via a wheel-hub bearing assembly interiorly attached to the gear casing.

12. The wheel assembly of claim 10, wherein the planet gears are meshed with a ring gear interiorly attached to the gear casing.

13. A wheel assembly comprising:
 a. a drivetrain member and a wheel-hub member, and a gearing assembly coupled to the wheel-hub member and positioned to mediate between the drivetrain member and the wheel-hub member;
 b. a gear casing comprising:
  i. a gear housing comprising a drive-gear volume for accommodating therewithin the gearing assembly, the drive-gear volume being in fluid communication with opposing first and second openings formed in the gear housing for respective gearing-assembly connections therethrough with the drivetrain member and the wheel hub member;
  ii. a lubricant compartment radially displaced from the drive-gear volume and in fluid communication therewith exclusively via an array of one or more lubricant passages disposed circumferentially around a portion of the gear housing, the lubricant-passage array arranged for flow therethrough of a gearing-assembly lubricant between the lubricant compartment and the gear housing;
 c. the gearing assembly positioned to mediate between the drivetrain member and the wheel-hub member, the gearing assembly disposed within in the gear casing and comprising a compound planetary gear train comprising (i) a sun gear in bearinged connection with the drivetrain member of the vehicle so as to be rotated thereby, (ii) a carrier in bearinged connection with the wheel-hub member, and (iii) a plurality of composite planet gears each having multiple radii;
 d. a brake assembly coupled to the wheel-hub member, the brake assembly being characterized by having a brake caliper connected thereto, wherein a thickness of the gear housing through the drive-gear volume is less than 120% of a width of the brake caliper, the thickness and the width both being in a direction parallel to a central axis of the gearing assembly.

14. The wheel assembly of claim 13, wherein a thickness of the gearing assembly is less than 110% of a width of the brake caliper, the thickness and the width both being in a direction parallel to a central axis of the gearing assembly.

15. The wheel assembly of claim 13, wherein the gearing assembly is disposed entirely between the wheel-hub member and a plane defined by an inward-facing rim of a wheel mounted to the wheel-hub member.

16. A vehicle comprising: a pair of opposing wheel assemblies, the wheel assemblies being according to claim 10; a corresponding pair of wheels; and the reference frame.

17. The gear casing of claim 1, wherein a thickness of the lubricant compartment is less than half of a thickness of the gear housing, the thickness of the lubricant compartment and the thickness of the gear housing both being in a direction parallel to a central axis of the gearing assembly.

18. The gear casing of claim 6, wherein a thickness of the lubricant compartment is less than half of a thickness of the gear housing, the thickness of the lubricant compartment and the thickness of the gear housing both being in a direction parallel to a central axis of the gearing assembly.

19. The gear casing of claim 9, wherein a thickness of the lubricant compartment is less than half of a thickness of the gear housing, the thickness of the lubricant compartment and the thickness of the gear housing both being in a direction parallel to a central axis of the gearing assembly.

20. The wheel assembly of claim 10, wherein a thickness of the lubricant compartment is less than half of a thickness of the gear housing, the thickness of the lubricant compartment and the thickness of the gear housing both being in a direction parallel to a central axis of the gearing assembly.

21. The wheel assembly of claim 13, wherein a thickness of the lubricant compartment is less than half of a thickness of the gear housing, the thickness of the lubricant compartment and the thickness of the gear housing both being in a direction parallel to a central axis of the gearing assembly.

22. The wheel assembly of claim 13, wherein the bearinged connection with the wheel-hub member is via a wheel-hub bearing assembly interiorly attached to the gear casing.

23. The wheel assembly of claim 13, wherein the planet gears are meshed with a ring gear interiorly attached to the gear casing.

* * * * *